United States Patent [19]

Schade

[11] 4,077,075

[45] Mar. 7, 1978

[54] HONEYCOMB FRAME FOR BEE-HIVE

[76] Inventor: Georg Schade, Borsegasse 1, Vienna, Austria, A-1010

[21] Appl. No.: 702,625

[22] Filed: Jul. 6, 1976

[30] Foreign Application Priority Data

Jul. 9, 1975 Austria .................................. 5284/75

[51] Int. Cl.² ............................................ A01K 47/02
[52] U.S. Cl. ......................................................... 6/10
[58] Field of Search ...................... 6/2 R, 2 A, 10, 11; 46/29

[56] References Cited

U.S. PATENT DOCUMENTS 3,303,581  2/1967  Levinson .................................. 46/29
3,806,969  4/1974  Varama .................................... 6/10

FOREIGN PATENT DOCUMENTS 909,069   11/1945  France ....................................... 6/10
618,997    9/1935  Germany .................................. 6/2 R Primary Examiner—Louis G. Mancene
Assistant Examiner—Peter K. Skiff
Attorney, Agent, or Firm—Kurt Kelman

[57] ABSTRACT

A honeycomb frame for a beehive is comprised solely of frame-forming elements of C-profile whose channels are inwardly directed. The abutting ends of these elements are connected by coupling members slidable into the C-profiles and in frictional engagement with the abutting ends. A queen cell cup, prewired foundations and the like are attached to the frame by fastening elements slidably mounted in the C-profile of the frame elements.

5 Claims, 17 Drawing Figures

HONEYCOMB FRAME FOR BEE-HIVE

Known honeycomb frames for beehives normally consist of cut and milled wooden bars which are interconnected at the corners by nails. These known wooden honeycomb frames have a short life because they become readily moistened, are affected by mold fungus and are used as shelter by undesirable insects, such as wax moths.

Honeycomb frames injection molded of synthetic resin are also know. For these, however, a separate injection mold is required for each frame size in view of the different sizes of beehives wherefore mass production of honeycomb frames is not economical.

It is the object of the invention to obviate the disadvantages of know honeycomb frames. The invention accomplishes this with a honeycomb frame formed all around of profiled elements which have a hollow section open on one side, preferably a C-section, and coupling members slidable into the profiled elements at the points of connection. According to the invention, it is possible to manufacture the profiled elements in large quantities either by injection molding or extruding synthetic resin, such as PVC or polyethylene. The profiled elements are then cut into the desired lengths and interconnected by the coupling members to form honeycomb frames. It is thus possible according to the invention to manufacture any desired honeycomb frame size in a simple manner. There is also the possibility of increasing the size of finished honeycomb frames subsequently in a simple manner by inserting additional profiled units.

Particularly useful coupling members are those with two tongues arranged perpendicularly to each other, which are slidable into the ends of the profiled elements to be connected. In this embodiment, it is useful for the coupling member to have a further tongue extending in a direction opposite to that of one of the first-named tongues. This further tongue serves in a simple as a lug for suspending the honeycomb frame in the beehive. On the basis of manufacturing the honeycomb frames of profiled elements, it is also possible in a simple manner to mount spacers slidable on the profiled elements whereby adjoining honeycomb frames are held at a desired distance. Preferably, fastening elements, for instance for fastening prewired and reinforced foundations of the queen cell cup or the like, are also slidably mountable on the profiled elements.

The invention will now be described in more detail in connection with the drawings. In the drawing, FIG. 1 shows a perspective view of one embodiment of a profiled element for a honeycomb frame according to the invention, FIGS. 2, 3 and 4, 5 are side and front views of a coupling member for the profiled elements;

Figure 1:
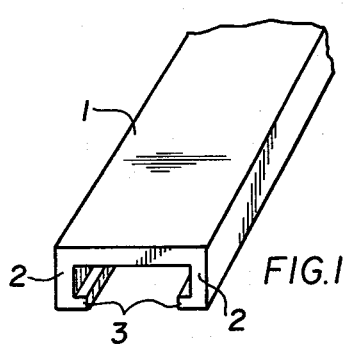

FIG. 1 shows one embodiment of a profiled element 1 according to the invention. It has essentially a C-section with two legs 2 and two inwardly directed flanges 3.

Figures 2, 3:
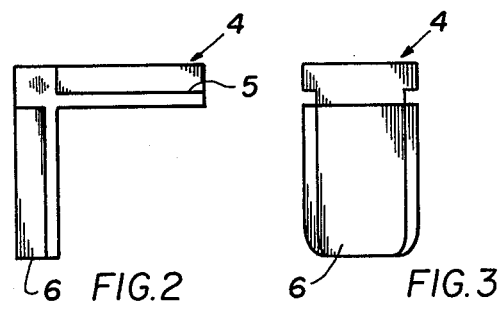
Figure 4:
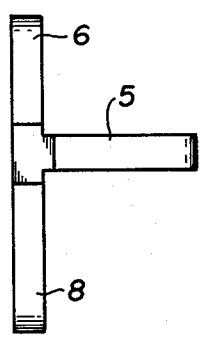
Figure 5:
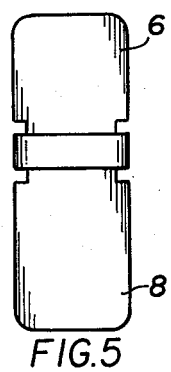
Figure 6:
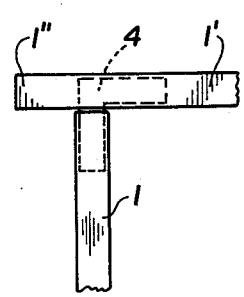
FIGS. 6 - 9 show various embodiments of connections for the manufacture of honeycomb frames from profiled elements.

Coupling member 4 according to FIGS. 2 and 3 has two tongues 5, 6 arranged perpendicular to each other, the tongues having an outer configuration corresponding to the inner profile of profiled element 1. FIGS. 4 and 5 show another embodiment of a coupling member 7 which has, in addition to tongues 5, 6, an additional tongue 8.

Figure 7:
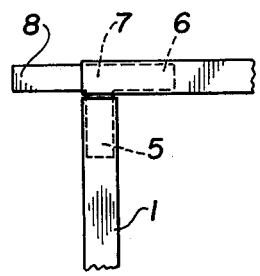
Figure 8:
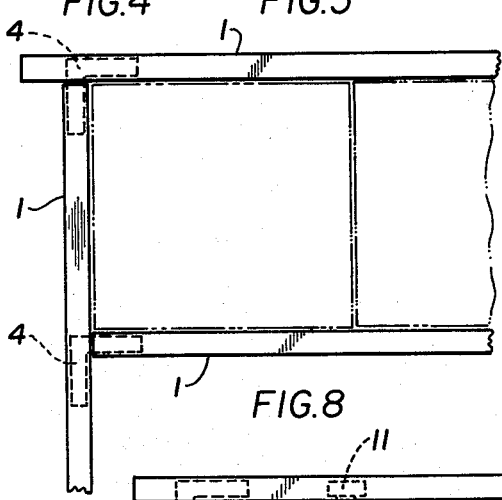
Figure 9:
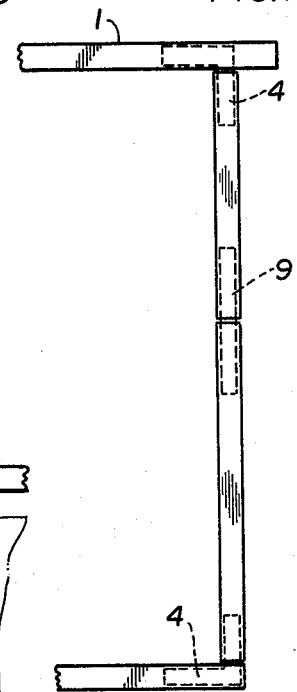
Figure 10:
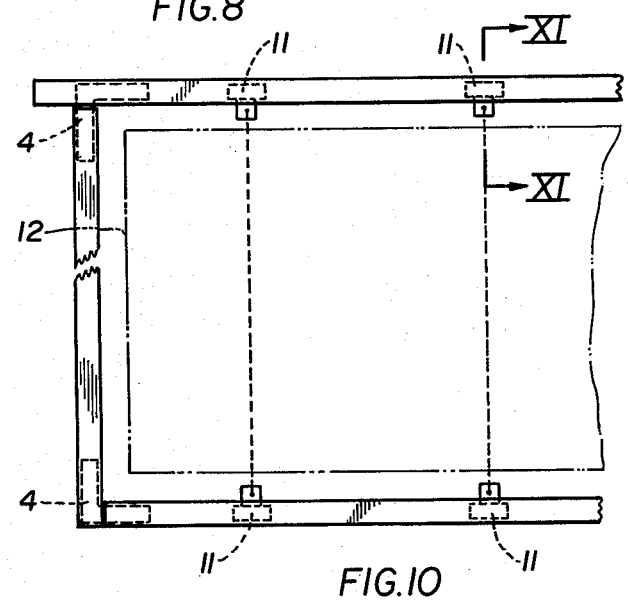
FIG. 10 shows a honeycomb frame according to the invention with fastening elements inserted therein.
Figure 11:
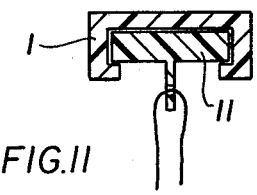
FIG. 11 is a section along line XI—XI of FIG. 10.
Figure 12:
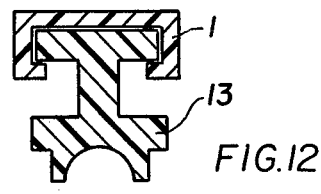
FIG. 12 shows a queen cell cup inserted in a profiled element, in section

FIGS. 6 - 9 show various embodiments of connections. Thus, in FIG. 6, one of the tongues of coupling member 4 is slid into end 1" of profiled element 1', end 1" being capable of serving as a lug for suspending the frame in the beehive. A lug for the honeycomb frame may also be obtained in a simple manner by tongue 8 of coupling member 7, as shown in FIG. 7. The use of profiled elements 1 and coupling members 4 also makes a sub-division of the honeycomb frame possible in a simple manner, for instance for inserting honey sections (FIG. 8). According to the invention, the frame size may also be increased without difficulty, for instance to increase the brood chamber. For this purpose, a coupling member 9 with two aligned tongues is used (FIG. 9). By the use of profiled elements, it is also possible to slide fastening elements laterally into the profile for fastening prewired foundations 12 (element 11) or a queen cell cup (element 13).

Figure 13:
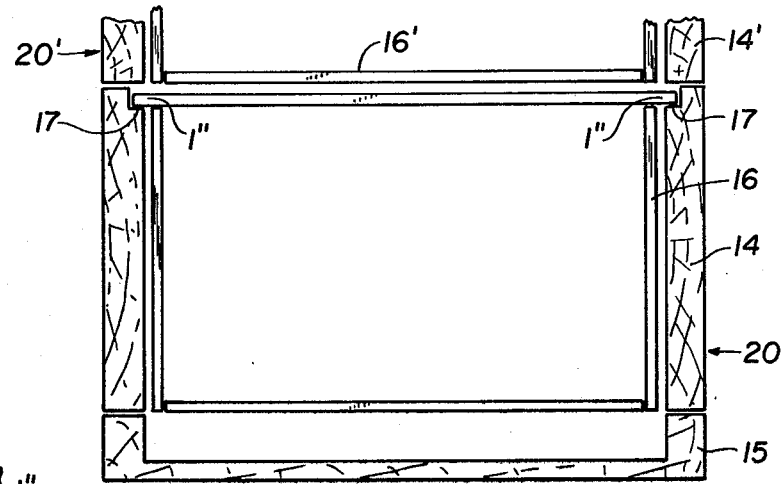
FIG. 13 is a sectional view of a beehive.
Figure 14:
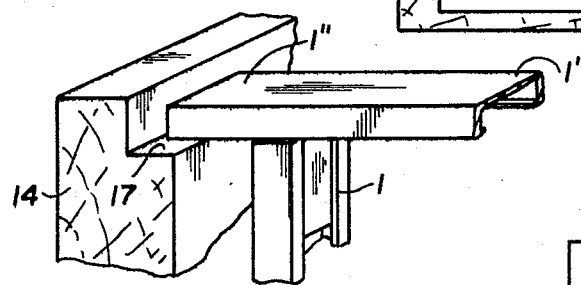
FIG. 14 is a detailed sectional view of the beehive of FIG. 13.
Figure 15:
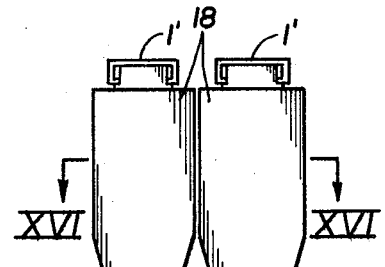
FIG. 15 is a side elevational view of two honeycomb frames with spacers.
Figure 16:
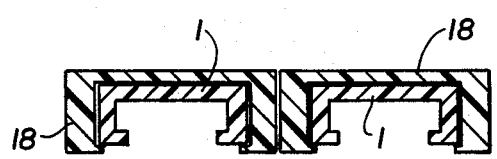
FIG. 16 is a section along line XVI—XVI of FIG. 15, on an enlarged scale.
Figure 17:
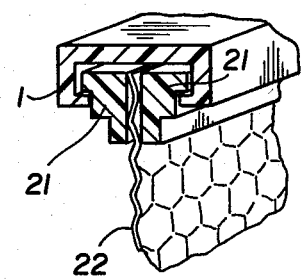
FIG. 17 is a view of a portion of a profiled element according to the invention, wherein clamping bars for fastening a reinforced foundation are inserted.

FIGS. 13 and 14 show the arrangement of honeycomb frame 16 according to the invention in a beehive constituted by bee magazine 20, 14 designating the side walls and 15 the bottom of magazine 20. Side walls 14 have shoulders 17 which serve as supports for lug 1" of honeycomb frame 16. A further magazine 20' with side walls 14' and honeycomb frame 16' is arranged above the honeycomb frame. To hold the honeycomb frames at a desired distance, a few spacers are fastened to the frame. By using honeycomb frames made of profiled elements according to the invention, spacers 18 may be slidably mounted directly on the profiled element, as shown in FIGS. 15 and 16. In FIG. 17, a profiled element 1 is shown into which two clamping bars 21 for clamping a reinforced foundation 22 have been inserted.

I claim:

1. A honeycomb frame for a beehive, comprised solely of frame-forming elements of C-profile, the C-profile being defined by two legs projecting inwardly from the frame and two flanges projecting from the legs towards each other, respective ones of the frame-forming elements having abutting ends, coupling members connecting the abutting ends, the coupling members being shaped for sliding into the C-profile of the frame-forming elements and for frictional engagement therewith, and honeycomb fastening elements projecting inwardly from the frame and slidably mounted in the C-profile of at least one of said frame-forming elements.

2. The honeycomb frame of claim 1, wherein respective ones of the frame-forming elements have abutting ends at right angles to each other to form respective corners of the frame, the coupling members at the corners having two lugs arranged perpendicularly to each other for sliding into the C-profiles of the respective abutting ends for connecting the same.

3. The honeycomb frame of claim 2, wherein at least one of the coupling members at the corners has a further lug extending in a direction opposite to that of one of the two perpendicularly arranged lugs.

4. The honeycomb frame of claim 1, further comprising a queen cell cup attached to one of the fastening elements.

5. The honeycomb frame of claim 1, further comprising a prewired foundation attached to one of the fastening elements.

* * * * *